INVENTORS
WILLIAM S. DURRELL
ROBERT J. ECKERT, JR.
YELAGONDAHALLY S. SURYANARAYANA

BY *Wenderoth, Lind & Ponack*

ATTORNEYS

Fig. 2

Table I

| Run | | Times through Column | % HCl in medium | % Hydrolysis Loss | % Hydrolysis Loss by Boiling |
|---|---|---|---|---|---|
| 1 | a | 2 | — | 0.13 | 0.95 |
|   | b | 1 | — | 0.26 | 0.95 |
| 2 | a | 1 | — | 0.80 | 2.1 |
|   | b | 2 | — | 0.53 | 2.1 |
| 3 |   | 2 | 17.5 | 0.13 | 2.8 |
| 4 |   | 2 | 18.0 | 0.53 | 2.4 |
| 5 |   | 2 | 15.0 | 0.01 | 0.91 |
| 6 |   | 2 | 17.2 | 0.21 | 1.28 |

INVENTORS
WILLIAM S. DURRELL,
ROBERT J. ECKERT, JR., AND
YELAGONDAHALLY S.
　　　　SURYANARAYANA

BY Wenderoth, Lind & Ponack

ATTORNEYS

United States Patent Office 3,535,090
Patented Oct. 20, 1970

3,535,090
METHOD AND APPARATUS FOR STRIPPING CYANOGEN CHLORIDE FROM A REACTION MEDIUM
William S. Durrell, Robert J. Eckert, Jr., and Yelagondahally S. Suryanarayana, Mobile, Ala., assignors to Geigy Chemical Corporation, Ardsley, N.Y.
Filed Jan. 9, 1967, Ser. No. 608,076
Int. Cl. C01b 3/00; C01h 7/08; C01d 19/00
U.S. Cl. 23—359                                    6 Claims

ABSTRACT OF THE DISCLOSURE

A stripping column having a packed upper section and a packed lower section has a chlorine feed inlet in the middle thereof and a steam reboiler at the bottom thereof. Reaction medium containing cyanogen chloride and chlorine therein is fed to the top of the column and chlorine is fed to the middle of the column. The cyanogen chloride is stripped from the reaction medium by the countercurrent flowing chlorine at substantially ambient temperatures. The thus stripped reaction medium then flows downward through the lower section and the chlorine is stripped therefrom by heated chlorine removed from the reaction medium by the heat from the steam reboiler.

BACKGROUND OF THE INVENTION

Field of the invention

This invention relates to a method and apparatus used in the production of cyanogen chloride, and more particularly relates to the stripping of cyanogen chloride and chlorine from the reaction medium from the flooded reactor with low hydrolysis losses and good stripping efficiency.

Cyanogen chloride is a valuable intermediate for the production of cyanuric chloride, which in turn is useful as an intermediate for the manufacture of many products, such as chemotherapeutic agents, herbicides, dyes, brightening agents, synthetic resins, plastics, rubber, explosives and other materials.

DESCRIPTION OF THE PRIOR ART

A presently used commercial process of preparing cyanogen chloride for conversion into cyanuric chloride is described in U.S. Pat. 3,197,273 in the name of Elwood Bruce Trickey. In this process, chlorine and hydrogen cyanide are charged into the reaction section of a packed column having a purification, mashing or scrubbing section, a reaction section, and a stripping section. Water is fed in at the top of the scrubbing section and steam is introduced at the base of the column at the bottom of the stripping section. By maintaining the proper rates of feed of the various materials, the temperature and conditions in the column can be maintained such that a high yield of cyanogen chloride is obtained as a gas at the top of the reactor.

The process of this patent, while it is quite satisfactory with respect to the quality and amount of the product which it desired to produce, also produces at the bottom of the reactor column a byproduct of dilute, i.e. 2–3% aqueous hydrochloric acid. This byproduct is relatively easily disposed of when the quantity thereof is small, but in actual practice, the amounts produced are so great that they cannot be disposed of simply by discharging into a stream or river without exceeding the amount which can be so discharged as established by pollution control standards. The alternative of concentrating the dilute hydrochloric acid and using it in other processes or selling it is not economically feasible, since the costs of concentrating the dilute acid are greater than purchasing concentrated acid from commercial sources.

Production of the cyanogen chloride under conditions which would produce the byproduct aqueous hydrochloric acid at higher concentrations have heretofore appeared to be an unlikely solution to the problems of byproduct disposal or byproduct recovery, because of the twin problems of intolerable, from the commercial standpoint, losses of the raw material hydrogen cyanide by hydrolysis and from the bottom of the reaction column along with the byproduct hydrochloric acid. The necessity to keep hydrolysis losses low and substantially eliminate loss of hydrogen cyanide are essential to the successful commercial production of cyanogen chloride.

A part of the problem of overcoming hydrolysis losses is connected with the manner in which cyanogen chloride and chlorine which are present in the reaction medium at the bottom of the reaction part of the apparatus used in producing the cyanogen chloride are removed or stripped from the reaction medium. In the above-mentioned patent this is done by heating the reaction medium with a steam reboiler. While this is satisfactory at the low concentration of the acid in that process, when the process is carried out at higher acid concentrations, heating to strip these materials from the reaction sharply increases hydrolysis.

SUMMARY OF THE INVENTION

The present invention relates to a method and apparatus for overcoming the problem of stripping cyanogen chloride and chlorine from a highly acid reaction medium by first feeding gaseous chlorine in countercurrent flow to the reaction medium in a packed reaction column at ambient temperatures in order to strip the cyanogen chloride therefrom without causing undue hydrolysis losses, and thereafter heating the thus stripped reaction medium to remove the chlorine therefrom. By keeping the temperature at which the cyanogen chloride is stripped from the reaction medium low, the hydrolysis losses can be kept low, and the later heating of the thus stripped reaction medium to remove the chlorine therefrom does not affect the hydrolysis losses. Stripping by this method reduces hydrolysis losses to as little as one-tenth or less of losses when stripping is carried out by conventional boiling methods.

BRIEF DESCRIPTION OF THE DRAWINGS

The invention will be described in connection with the accompanying drawing, in which FIG. 2 is a table showing the results of Examples 1–6.

DESCRIPTION OF THE PREFERRED EMBODIMENT

Figure 1:
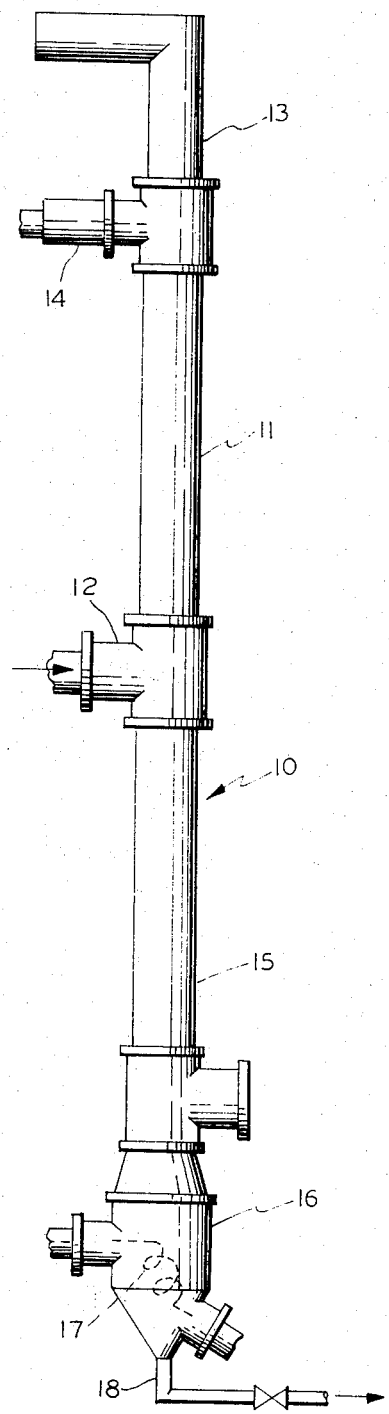
FIG. 1 is a schematic view of a stripping column for carrying out the method of the present invention.

The apparatus according to the invention comprises a stripping column generally designated 10, which has an upper packed stripping section 11 which is filled with a packing of conventional shapes. At the bottom of the upper packed section 11 is a chlorine inlet 12, and at the top of the upper packed section 11 is a chlorine outlet 13 opening out of the top of the column, and a liquid inlet 14 opening into the top of the column just below the chlorine outlet.

The column 10 also has a lower packed stripping section 15 which is also filled with a packing of conventional shapes. At the bottom of the lower packed stripping section is a reboiler 16 having a steam coil 17 therein. A hydrochloric acid line 18 comes off the bottom of the reboiler 16.

In the particular use for which the stripping column of the present invention was designed, the chlorine outlet 13 at the top of the upper packed stripping section 11 will be connected by means of a chlorine line to the bottom of a reaction column (not shown) in which the chlorine is reacted with hydrogen cyanide in an aqueous medium to produce cyanogen chloride. One such reactor is disclosed in copending application Ser. No. 608,129 filed on even date herewith and entitled "Method and Apparatus for Sparging Chlorine into a Reactor for Producing Cyanogen Chloride" and now abondoned. The liquid inlet 14 is also connected to the bottom of the reaction column by means of a conduit for conveying the liquid reaction medium from the bottom of the reaction column into the top of the stripping column 10.

In operation, an aqueous reaction medium which is comprised of hydrochloric acid at a concentration of from about 15 to about 20% and having CNCl therein up to saturation, and also having chlorine therein, and at a temperature of from about 60° C. down to ambient, is to the top of the upper packed stripping section 11 and it trickles down over the packing in said section. Chlorine in gaseous form and at ambient temperature is fed into the column 10 through the inlet 12 and passes upwardly through the packed upper stripping section 11 in countercurrent flow to the reaction medium. The effect of this operation is to strip CNCl from the reaction medium as CNCl without reacting it to any substantial extent either with the chlorine or to hydrolyze it. Due to the heat exchange conditions in the packed stripping section, the stripping operation is carried out at substantially ambient temperature, or only slightly thereabove. As a result, the temperature conditions for hydrolysis are unfavorable even though the acidity of the reaction medium is high.

Steam is fed to the steam coil 17 of the reboiler 16, and the reaction medium stripped of CNCl continues to flow downwardly through the lower packed stripping section. It will be heated by heated gaseous chlorine which is boiled out of the reaction medium by the heat from the steam in the reboiler 16. However, this section of the column is made sufficiently long that sufficient heat exchange takes place between the down-flowing reaction medium and the upflowing gaseous chlorine removed therefrom that when the gaseous chlorine reaches the chlorine inlet 12 it is substantially at ambient temperature.

In the stripping of the CNCl from the reaction medium fed to the top of the stripping column by the use of chlorine at ambient temperature there is no conversion of any significant amount of the CNCl to another compound, such as $NH_4Cl$. It is removed as CNCl. Further, the chlorine used to strip the CNCl can be used in the reaction column for reaction with HCN to produce CNCl without any significant increase in hydrolysis losses.

In order to illustrate the invention more fully, a series of examples will be given for the stripping of CNCl by the use of chlorine at ambient temperatures.

EXAMPLES 1–6

The stripping runs 1–6 of Table I were performed in a column 6 ft. long and 1 in. in diameter which was packed with ⅛ in. Rashig rings. The column corresponding to only the upper packed stripping section of the apparatus of FIG. 1. Chlorine at ambient temperature was supplied from a separate supply of chlorine, and the CNCl containing reaction medium was supplied from a separate reaction column in which the HCl was from 15 to 20%. In the actual examples, the reaction medium was simply poured through the stripping column at a rate of 10 cc./min., while the $Cl_2$ was fed into the bottom of the column at a rate of 5 cc./min.

In order to give some idea of the improvement which is obtained by the method of the present invention, stripping was also performed by the conventional boiling method, i.e. boiling the reaction medium with a steam boiler, for the same reaction medium used in runs 1–6, and the table shows that the percent loss due to hydrolysis in the stripping portion of the overall process for producing CNCl can be reduced from several percent to only small fractions of a percent.

The stripping column 10 which has been shown and described in connection with the figure is separated from any reaction column, being adapted to be connected to such a column by feed lines. However, it is possible to connect the stripping column directly to the bottom of a reaction column. In addition, the operation has been described in connection with a preceding operation of reacting chlorine and hydrogen cyanide to produce cyanogen chloride. The invention is not limited to use with such a preceding operation.

There has thus been described an apparatus and a method of operating that apparatus in which cyanogen chloride is stripped from a reaction medium under conditions which will insure low hydrolysis losses. The chlorine used in the stripping operation can then be used as a reactant for the reaction for producing cyanogen chloride without appreciably increasing the hydrolysis losses in such a reaction. The CNCl is stripped as such by passing the chlorine used for the stripping operation back into the reaction apparatus for producing the CNCl.

It is thought that the invention and its advantages will be understood from the foregoing description and it is apparent that various changes may be made in the form, construction and arrangements of the parts without departing from the spirit and scope of the invention or sacrificing its material advantages, the form hereinbefore described and illustrated in the drawings being merely a preferred embodiment thereof.

What is claimed is:

1. A method of stripping cyanogen chloride from an acid reaction medium comprising hydrochloric acid at a concentration of from about 15 to about 20%, comprising the steps of passing the reaction medium in one direction over packing while passing gaseous chlorine at ambient temperatures in the opposite direction over said packing in countercurrent flow to the reaction medium, and recovering the stripped cyanogen chloride mixed with the chlorine in gaseous form at one end of the packing and recovering the stripped reaction medium at the other end of the packing.

2. A method as claimed in claim 1 in which the reaction medium is fed to the packing at a temperature no higher than about 60° C.

3. A method as claimed in claim 1 and further comprising stripping the chlorine from the reaction medium after the cyanogen chloride has been stripped therefrom, and comprising the further steps of passing the recovered reaction medium which has had the cyanogen chloride stripped therefrom over a further packing and heating the reaction medium after it has been passed over the further packing to drive off the chlorine, passing the driven off chlorine over the further packing in countercurrent flow to the reaction medium, recovering the reaction medium, and combining the driven off chlorine with the chlorine passed over said first-mentioned packing.

4. A method as claimed in claim 3 in which the further packing is sufficient to reduce the temperature of the driven off chlorine to ambient temperature when it reaches the point at which the chlorine-containing medium is introduced to the further packing.

5. A method of operating a stripping column for stripping cyanogen chloride and chlorine from a highly acid reaction medium, the column having a packed upper section filled with a packing, a packed lower section filled with a packing, a reaction medium inlet and a gas outlet at the top of the column, an inlet for gaseous chlorine substantially midway of the length of the column, a heating means in the bottom of the column, said method comprising feeding an acid reaction medium comprising hydrochloric acid at a concentration of from about 15 to about 20% and containing cyanogen chloride into the top of the column at a temperature no greater than about 60° C., feeding chlorine in gaseous form and at ambient temperature into the middle of the column through the chlorine inlet, operating heating means for heating the reaction medium which reaches the bottom of the column, and removing gaseous chlorine having cyanogen chloride therein from the top of the column and stripped hydrochloric acid from the bottom of the column.

6. A method of operating a stripping column for stripping cyanogen chloride from a highly acid reaction medium, the column being a packed column having a reaction medium inlet and a gas outlet at the top and a gas inlet and a reaction medium outlet at the bottom, comprising the steps of feeding an acid reaction medium comprising hydrochloric acid at a concentration of from about 15 to about 20% and containing cyanogen chloride to the top of the column at a temperature not greater than about 60° C., and feeding gaseous chlorine at ambient temperature to the bottom of the column, and removing gaseous chlorine having cyanogen chloride therein from the top of the column and reaction medium having the cyanogen chloride stripped therefrom from the bottom of the column.

References Cited

UNITED STATES PATENTS 3,197,273  7/1965  Trickey _____ 23—359

OSCAR R. VERTIZ, Primary Examiner

H. S. MILLER, Assistant Examiner

U.S. Cl. X.R.

23—154, 270